US006324925B1

(12) United States Patent
Suovaniemi et al.

(10) Patent No.: US 6,324,925 B1
(45) Date of Patent: Dec. 4, 2001

(54) SUCTION DEVICE WITH MEANS FOR REMOVING A REPLACEABLE TIP

(75) Inventors: Osmo Suovaniemi; Pertti Ekholm, both of Helsinki (FI)

(73) Assignee: Biohit Oyj, Helsinki (FI)

( * ) Notice: Subject to any disclaimer, the term of this patent is extended or adjusted under 35 U.S.C. 154(b) by 0 days.

(21) Appl. No.: 09/701,002

(22) PCT Filed: Jun. 9, 1999

(86) PCT No.: PCT/FI99/00499

§ 371 Date: Nov. 22, 2000

§ 102(e) Date: Nov. 22, 2000

(87) PCT Pub. No.: WO99/64159

PCT Pub. Date: Dec. 16, 1999

(30) Foreign Application Priority Data

Jun. 10, 1998 (FI) ..................................................... 981326

(51) Int. Cl.[7] ..................................................... G01L 3/02

(52) U.S. Cl. ..................................................... 73/864.14

(58) Field of Search ........................... 73/864.01, 864.11, 73/864.13, 864.14, 864.16, 864.24; 422/100

(56) References Cited

U.S. PATENT DOCUMENTS 3,853,012 12/1974 Scordato et al. .
4,257,267 * 3/1981 Parsons ............................ 73/864.14
5,403,553 4/1995 Heinonen .
5,807,524 * 9/1998 Kelly et al. ...................... 73/864.14

FOREIGN PATENT DOCUMENTS 0155087 9/1985 (EP) .
WO9104793 4/1991 (WO) .

* cited by examiner

*Primary Examiner*—Robert Raevis
(74) *Attorney, Agent, or Firm*—Birch, Stewart, Kolasch & Birch, LLP

(57) ABSTRACT

A method for removing a replaceable tip used with a suction device for dispensing a liquid removes the tip by bringing a removal device, arranged in an air space formed jointly by a sample space of a replaceable tip and a cylindrical space of an end part of a suction device, movable between its two extreme positions, namely an inner home position and an outer removal position, into cooperation with an inside surface of the replaceable tip mounted on the end part whereby the movement of the removal device into its removal position causes the replaceable tip to be detached from the end part. A suction device is provided for using the method.

12 Claims, 2 Drawing Sheets

SUCTION DEVICE WITH MEANS FOR REMOVING A REPLACEABLE TIP

This application is the national phase under 35 U.S.C. §371 of PCT International Application No. PCT/FI99/00499 which has an International filing date of Jun. 9, 1999, which designated the United States of America.

FIELD OF THE INVENTION

The object of this invention is a method for removing a replaceable tip for use in a suction device for dispensing, transferring, diluting, titrating, or mixing a liquid, or for a combination of all or some of these operations.

The object of this invention is also a suction device for dispensing, transferring, diluting, titrating or mixing a liquid, or for a combination of all or some of these operations, which suction device has an end part enclosing a cylindrical space having a reciprocating piston for changing the volume of the cylindrical space, the end part being provided with an aperture in the extremity thereof intended for receiving a replaceable tip, in order to form a gas passage between the sample space of the said replaceable tip and the cylindrical space, and which has means for removing the tip.

DESCRIPTION OF THE BACKGROUND ART

Since the 1970s suction devices have been in use, in which the replaceable tip has been released and removed from the body with mechanical means without the need to touch the replaceable tip by hand. This is to avoid getting into contact with active and often even dangerous chemical and biological samples and reagents. The solutions have included mechanisms comprising levers or sleeves which have been mounted upon the pipette body. These mechanisms, which are known among others from the Finnish patent publications 56937 and 57540, have, however, increased the outer dimensions of the body beyond the outer diameter of the replaceable tip. From the U.S. Pat. No. 4,616,514 a suction device is known in which the replaceable tip is attached to the body the end part having finger-like strips provided with shoulders and in which the replaceable tip is released with a moveable means mounted within the end part acting on the finger-like strips. Also in this solution the end part will be greater than the replaceable tip to its diameter. In the development of diagnostic methods, nowadays one strives at such methods, in which the volumes of the samples and reagents utilized are increasingly smaller, which also leads to the use of increasingly smaller sample tubes. The removal means for replaceable tips mounted on the body of the suction device have restrained the changeover to using small sample tubes and therefore the removal devices have been removed from the suction devices. In these cases the tips have to be removed manually, whereby the risk for contamination again increases. There are also procedures in use in which the replaceable tip is removed by means of a U-shaped notch located in the side of a waste container.

In the following, the 'suction device' stands for as such known manual or electrical suction devices or pipettes, which are used for pipetting, dispensing, diluting, titrating or mixing, or for a combination of all or some of these operations.

The use of these suction devices in handling liquids, such as samples or reagents, is described as a simplified example in the following. Once a replaceable tip has been attached to the end part of the body of the suction device and the piston moving in the cylindrical space of the end part is brought to its home position, whereby the piston is situated in the cylindrical space at that end which is closest to the end part of the suction device, the handling can be started. The outermost open end of the replaceable tip is immersed into the liquid of which it is desired to take a sample. When the piston is now moved inwards into the cylindrical space, the change in the volume formed jointly by the sample space of the replaceable tip and the cylindrical space brings about suction of the sample or reagent into the sample space of the replaceable tip. When it is desired to dispense the sample or the reagent taken in this way into the tip, the piston is moved towards the end part, whereby the said volume diminishes and at the same time the liquid in the replaceable tip exits from the open end of the replaceable tip. Several of these suction and dispensing stages can be combined in succession to bring about the desired handling. In these stages of sample handling the piston is moved to bring about the desired suction or dispensing. In most cases as the last stage the piston is moved past its home position mentioned above to a blowout position so that the replaceable tip is completely emptied. Thereafter the replaceable tip is removed from the end part of the body of the suction device.

SUMMARY OF THE INVENTION

The object of the invention is to provide a method and a device using the same for removing tips used in suction devices without touching them manually. It is essential for this invention that the means needed for the removal are at least mainly within the body of the suction device and do not thereby increase the outer dimensions of the end part of the suction device beyond the outer diameter of the replaceable tip.

The method being the object of the invention is characterized in that the replaceable tip is removed by bringing a removal means, mounted in the air space formed jointly by the sample space of the replaceable tip and the cylindrical space of the end part of the suction device, which is movable between its two extreme positions, namely an inner home position and an outer removal position, to move into cooperation with an inside surface of the replaceable tip mounted on the end part, whereby the movement of the removal means into its removal position brings about the detachment of the replaceable tip from the end part.

Bringing the removal means into cooperation with the inside surface of the tip means that the movement of the removal means is communicated to cause a removal movement of the replaceable tip attached to the end part of the body of the suction device, e.g. by bringing the removal means in contact with the inside surface of the replaceable tip, or in contact with means associated with the inside surface of the tip, such as projections, pegs, ribs, fins, circular projections, or with means within the said air space engaging the inside surface of the tip.

The removal of the tip in the method according to the invention can take place so that the removal means in moving to the position for removal, extends outside through an aperture in the end part into the sample space of the tip into contact with the inside surface of the tip, or with means associated therewith. According to an alternative embodiment, the means in association with the inside surface of the tip protrude into the cylindrical space of the end part, and are brought there in contact with the removal means.

The method according to the invention is especially suitable for the removal of such replaceable tips which are attached onto the tip of the end part of the body of the suction device most preferably with a friction joint. For the removal according to the invention, such replaceable tips for attachment onto the tip of the end part of the body of the suction device are advantageous, in which the inside diameter of the sample space of the replaceable tip tapers from the point of attachment towards the other end of the replaceable tip. In these cases the removal means can in its position for removal, according to one embodiment, be brought into direct contact with the inside surface of the sample space of the replaceable tip. Further the method according to the invention is preferably suitable for the removal of such replaceable tips for attachment onto the tip of the end part of the body of the suction device, which in that end which is intended to be attached to the body of the suction device, or in its vicinity, on the inside surface of the replaceable tip are provided with projections, pegs, fins, circular projections, transversal ribs or other similar means or means within the sample space of the replaceable tip, over which the removal means comes into contact with the replaceable tip in its position for removal. In this case the removal means comes preferably into contact with only such surfaces which have not been in contact with the sample. When the removal means comes into contact with the inside surface of the replaceable tip, with means projecting into the sample space or with means within the sample space, the movement of the removal means is communicated to the replaceable tip and when the movement is substantially parallel with the longitudinal axis of the replaceable tip, the replaceable tip is made to detach from the end part of the suction device.

The movement of the removal means can be brought about by the movement of the piston provided for changing the volume of the cylindrical space of the end part of the body of the suction device, whereby preferably the end of the said piston is brought into contact with the removal means. In moving past its position for blowout, the piston pushes the removal means out of the end part of the body of the suction device and the removal means brings about the detachment of the replaceable tip. According to an alternative embodiment, the movement of the said removal means is brought about by an extension part of the piston, e.g. a part which is telescopically moveable with regard to the piston, whereby there is no need to move the piston itself past the sample handling positions.

According to a preferred embodiment, after the removal of the replaceable tip, the removal means is returned to its home position by a compression spring arranged in the cylindrical space of the end part of the suction device.

The suction device according to the invention in turn is characterized in that a removal means is arranged to move in the cylindrical space of the end part of the suction device at least partially between two extreme positions, namely between an inner home position and an outer removal position. According to a preferred embodiment, in the removal position, the removal means can be brought to extend out of the aperture of the end part, into the sample space of the replaceable tip mountable on the tip of the end part, in order to remove the replaceable tip from the end part. In its inner extreme position, in the home position, the removal means is thus totally or almost totally within the cylindrical space of the end part of the body of the suction device, but in its outer extreme position, in the removal position, it extends outside of the aperture of the end part of the body of the suction device into the sample space of the replaceable tip, mountable on the end part. In this removal position, the removal means comes into contact with the replaceable tip, with the inside surface of its sample space, with shoulders, ribs, fins or other similar means protruding into the sample space, or with other means associated with the inside surface in the sample space, whereby the replaceable tip is detached from the end part of the body of the suction device when the movement of the removal means continues in the direction of the end part of the suction device and out of this end part. According to an alternative embodiment, the removal means is in its every position, thus both in its home position and in its removal position, within the cylindrical space, and is brought in the removal position into cooperation with shoulders, or other corresponding means associated with the inside surface of the tip and protruding into the cylindrical space.

In a preferred embodiment of the suction device according to the invention, a compression spring is arranged in the cylindrical space of the end part of the suction device between this end part and the removal means in order to return the removal means back to its home position after the removal of the replaceable tip. When the removal means is in its removal position, the spring is compressed and it is uncompressed in the home position for the removal means.

According to an embodiment of the suction device, the removal means and the piston, more specifically that end of the piston which is nearest to the removal means, have at least two positions with respect to each other, in one of which the piston in the sample handling position is not in contact with the removal means, in its home position, and in the second position, which compared to the first one is a rotated position with regard to the longitudinal axis of the piston, the piston at least in some sample handling positions can be brought into contact with the removal means in its home position. This is brought about by suitable mutual designs of the piston and the removal means e.g. so, that the piston and the removal means in the first of the said mutual positions are nested or intermeshed without being in contact with each other and in the latter of the mutual positions they are in contact with each other. In this latter mutual position, the movement of the piston brings the removal means to its removal position in some of the sample handling positions.

Still according to one embodiment there is provided a spring or spring-like means between the said piston and the removal means in the cylindrical space, which spring or spring-like means in the home position of the removal means is compressed and in the removal position of the removal means is released or uncompressed. The spring locks to its compressed state e.g. when attaching the replaceable tip to the end part of the body of the suction device, whereby at the same time the removal means is brought to its home position. The said spring is preferably designed so that it due to the locked state can remain compressed until an outside contact releases the locked state. The release of the locked state is brought about by the said piston or a telescopically movable extension part thereof contacting the spring. When the locked state of the spring is released the spring, when released, brings the removal means to move to the removal position, whereby the replaceable tip is detached from the end part of the suction device. In a preferred embodiment according to the invention the said spring can be a part of the removal means.

According to one embodiment of the invention, the removal means can also be designed so, that it is a separate, as such easily removable supplementary part, which can be removed from the end part of the suction device. This is necessary in those cases, where a possible carryover of samples or reagents by the removal means to the next replaceable tip to be used must be avoided. The removal means can be removed either at the same time with the replaceable tip or after the removal of the replaceable tip either manually or with the movement of the said piston.

In all of the embodiments of the suction device according to the invention the removal means or respectively the shoulders or similar means protruding into the cylindrical space from the inside surface of the tip, are shaped so, that they allow a gas passage to be formed between the cylindrical space and the sample space of the tip. This can be realized e.g. by means of holes, channels, grooves or other similar openings through the removal means.

According to an alternative embodiment of the invention, the suction device does not have a separate removal means, but the piston moving in the cylindrical space for changing the cylindrical volume, or a part thereof, e.g. an extension part telescopically movable with respect to the piston, acts as the said removal means. The removal movement of the tip is brought about by moving the piston past its blowout position to its removal position, or alternatively by activating the extension part to move into the removal position, into cooperation with the tip as described above. In order to avoid contaminations in this case it is important that the piston or its extension part comes into contact with only such surfaces which have not been in contact with the samples. This embodiment is advantageous especially in such an embodiment, in which the removal means in each of its positions moves inside the cylindrical space and in which the means associated with the inside surface of the replaceable tip, such as projections, or other similar means, in turn protrude into the cylindrical space.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is described in following by means of examples with reference to the enclosed drawings which are given by way of illustration only, and thus are not limitative of the present invention, and in which.

DETAILED OF THE PREFERRED EMBODIMENTS

Figure 1:
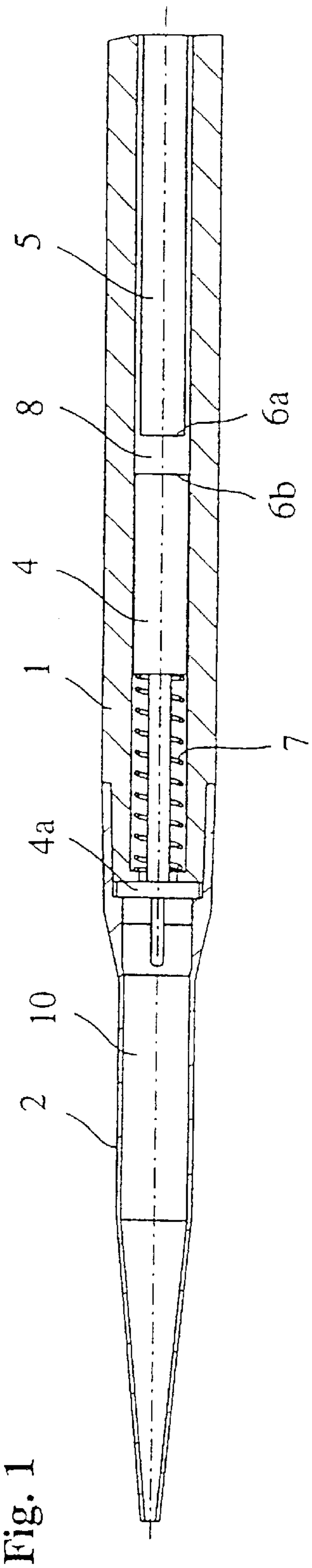
FIG. 1 illustrates a longitudinal section of a suction device having a removal means and a exchangeable replaceable tip.

In the FIGS. 1–6 the same reference numbers are used for parts corresponding to each other. In FIG. 1 the end part of the suction device is referenced with number 1, the replaceable tip adapted onto the end part with number 2, its sample space with number 10 and the removal means with number 4. In the cylindrical air space 8 of the end part the piston 5 moves slidingly for changing the volume of the cylindrical space 8. In the illustrated embodiment the position 6*a* of the piston 5 is the home position of the piston and the position 6*b* is the home position of the removal means 4. The spring 7, which is mounted in the cylindrical space 8 between the distal end of the end part 1 of the suction device and the removal means, holds the removal means 4 in its home position 6*b*. In its home position 6*a* the piston 5 is not in contact with the removal means 4 in its home position 6*b*. When the replaceable tip 2 is to be detached, the piston 5 is brought to move past its home position 6*a*, whereby the piston 5 first comes into contact with the removal means 4, and the movement continuing, the piston 5 pushes the removal means 4 and when this has come into contact with the inside surface of the replaceable tip 2 or with shoulders, projections or with means in the sample space 10 of the replaceable tip 2, it detaches the replaceable tip 2 from the end part 1 of the suction device. When the replaceable tip 2 is detached, the piston 5 is brought to move back to its home position 6*a*. The compression spring 7 returns the removal means 4 to its home position 6*b*.

Figure 2:
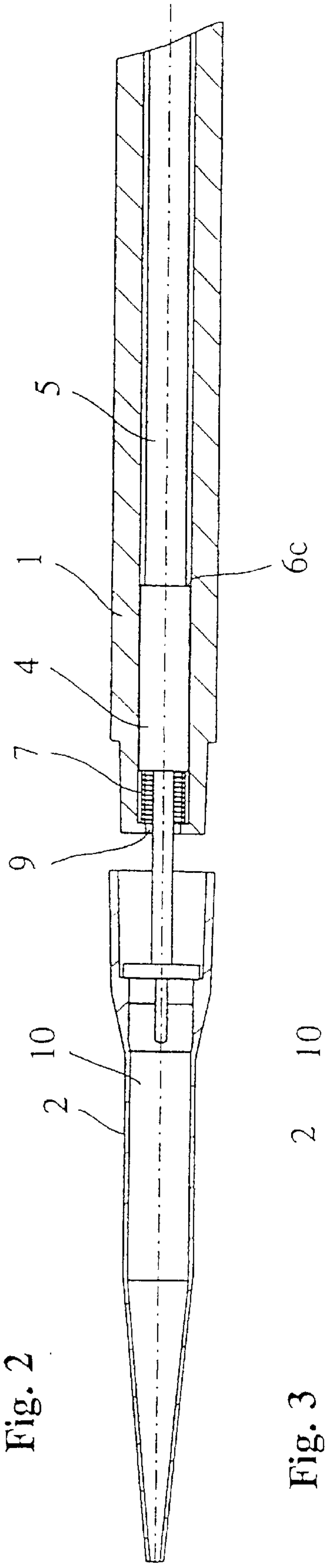
FIG. 2 illustrates a section corresponding to FIG. 1 showing the removal of the replaceable tip by means of the removal means.

In FIG. 2 is illustrated the removal according to the invention of the replaceable tip 2 from the end part 1 of the body of the suction device with the removal means 4 being in its removal position 6*c*. The figure also shows the aperture 9. which forms the gas passage between the sample space 10 of the replaceable tip 2 and the cylindrical space 8.

Figure 3:
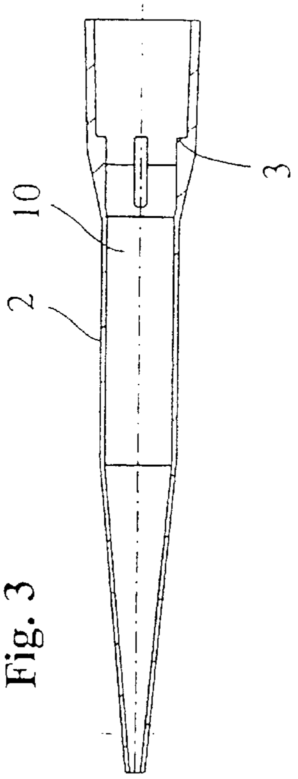
FIG. 3 illustrates the replaceable tip with projections protruding into the sample space.

In FIG. 3 is illustrated an embodiment of the replaceable tip 2 having a shoulder 3, protruding into the sample space 10, which in cooperation with the removal means 4 brings the replaceable tip 2 to be detached in the position 6*c* of the removal means 4.

Figure 4:
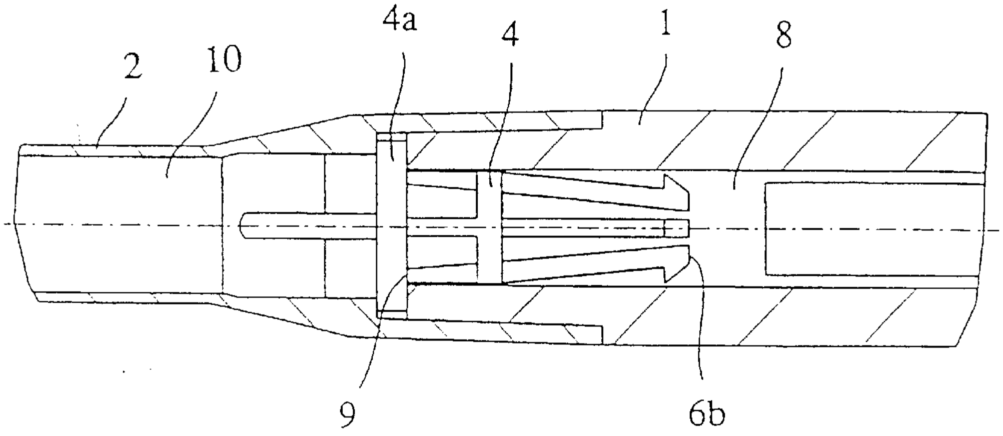
FIGS. 4 and 5 illustrate the alternative embodiments of the removal means.

In FIG. 4 is illustrated an embodiment of the removal means 4 according to the invention, in which the removal means 4 remains in its home position 6*b* by means of friction between the means 4 and the wall of the cylindrical space 8, the friction, however, not preventing the movement of the removal means 4. The removal means 4 is made of an elastic material, e.g. of plastic having suitable characteristics. That part of the removal means 4 which extends into the cylindrical space 8 is, in a preferred embodiment, comprised of strips the ends of which extending into the cylindrical space 8 being formed as tips so that the removal means 4 can easily be pushed through the aperture 9 into the cylindrical space 8. The tips lean against the inner walls of the cylindrical space 8 and hold the removal means 4 slidingly attached to the cylindrical space 8. Due to the strip-like construction of the removal means a gas passage is formed between the cylindrical space 8 and the sample space 10 of the replaceable tip 2.

Figure 5:
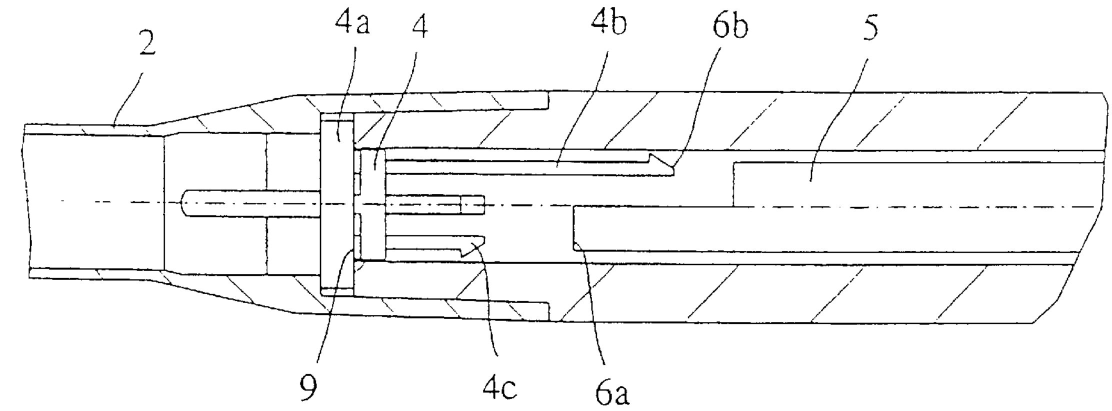

FIG. 5 illustrates such a device according to the invention, in which the removal means 4 in the example is formed so that the part of the removal means 4 which extends into the cylindrical part comprises both of longer strips 4*b* and of shorter strips 4*c*. The removal means can be made of an elastic material, e.g. of plastic. The ends of the strips 4*b* and 4*c* are formed into tips so that the removal means 4 can easily be pushed through the aperture 9 into the cylindrical space 8. The tips lean against the inner walls of the cylindrical space 8 and hold the removal means 4 slidingly attached in the cylindrical space 8. The end of the piston 5 is respectively designed in a steplike fashion so that the piston in its home position 6*a* is in such a position with regard to the removal means 4 that the end of the piston 5 is not in contact with the shorter strips 4*c* of the removal means 4 in the home position 6*b* of the removal means. When the piston 5 is brought sufficiently further into the cylindrical space 8 with respect to its home position 6*a* and after that it has been rotated around its longitudinal axis e.g.

180°, when moving back towards its home position 6*a* and possibly past it, it comes into contact with the longer strips 4*b* of the removal means 4, whereby a continuation of the movement brings the removal means 4 to move into the removal position and the detachment of the replaceable tip 2.

Figure 6:
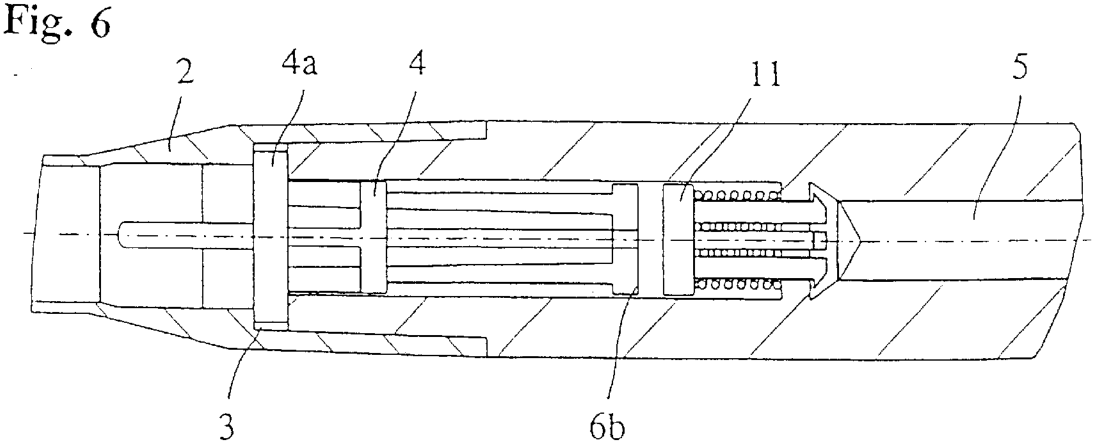
FIG. 6 illustrates a longitudinal section of such a suction device having a spring-like means between the piston and the removal means.

In FIG. 6 there is illustrated a preferred embodiment of the invention, in which there is a spring-like means 11 arranged in the suction device in the cylindrical space between the piston 5 and the removal means 4. This spring-like means 11 has such a construction that it can be compressed and locked into this compressed state. The locked state can be released by an external contact, whereby the means 11 returns to its uncompressed state, in which state the length of the means 11 is substantially greater than the compressed length. This spring-like means 11 is illustrated in the figure locked in its compressed state, whereby the removal means is in its home position 6*b*. When the piston 5, after having moved past also its blowout position, comes into contact with the means 11, the locked state of the spring means 11 is released and the means 11, when being released to its uncompressed state, causes the removal means 4 to move to the removal position and the detachment of the replaceable tip 2.

In all embodiments the removal means 4 is designed so that it allows a gas passage to be formed between the cylindrical space 8 and the sample space 10 of the replaceable tip 2, e.g. by means of holes, channels formed in the removal means 4 and/or in its end 4*a* nearest the replaceable tip 2, or by means of other similar openings or grooves provided through the removal means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for removing a replaceable tip which encloses a sample space, the replaceable tip being useable in a suction device for dispensing, transferring, diluting, titrating, or mixing a liquid, the suction device having an end part enclosing a cylindrical space with a reciprocating piston for changing volume of the cylindrical space, the replaceable tip being fitted on an outside surface of the end part, the method comprising the steps of removing the tip with a removal device, the removal device being mounted in an air space formed jointly by the sample space of the replaceable tip and the cylindrical space of the end part of the suction device, moving the removal device between an inner home position and an outer removal position, the removal device being moved into contact with an inside surface or into contact with projections, pegs or ribs associated with the inside surface of the replaceable tip, whereby movement of the removal device into the outer removal position detaches the replaceable tip from the end part.

2. The method according to claim 1, wherein the movement of the removal device to the outer removal position is brought about by the movement of the piston moving reciprocatingly in the cylindrical space of the end part of the suction device and provided for changing the volume of the cylindrical space.

3. The method according to claim 1, wherein the end of the piston is brought into contact with the removal device.

4. The method according to claim 1, wherein the removal device is removed from the end part by movement of the piston provided for changing the volume of the cylindrical space.

5. The method according to claim 1, wherein the removal device is removed from the end part together with the detachable replaceable tip.

6. The method according to claim 1, wherein the removal device is returned to the home position by a compression spring.

7. A suction device for dispensing, transferring, diluting, titrating, or mixing a liquid, the device comprising an end part and a replaceable tip with a sample space being fitted on an outer surface of the end part, the end part enclosing a cylindrical space having a reciprocating piston for changing volume of the cylindrical space, the end part being provided with an aperture in an extremity thereof in order to form a gas passage between the sample space of the replaceable tip and the cylindrical space of the suction device, the suction device further comprising means for removing the replaceable tip, the removal means being arranged to move at least partially in the cylindrical space of the end part of the suction device between an inner home position and an outer removal position where the removal means comes into contact with the inside surface or into contact with projections, pegs or ribs on the inside surface of the replaceable tip and thereafter pushes the replaceable tip from the end part.

8. The suction device according to claim 7, wherein the removal means is arranged in the removal position to extend out of the aperture of the end part into the sample space of the replaceable tip attachable onto the end of the end part for removing the replaceable tip from the end part.

9. The suction device according to claim 7, wherein the end part is provided with a compression spring for returning the removal means to the home position.

10. The suction device according to claim 7, wherein the piston and the removal means each have a common longitudinal axis and wherein for a first position, the piston and the removal means are at a distance from each other along their longitudinal axes, the first position being at least one sample handling position and wherein for a second position, the piston contact the removal means in order to push the removal means to the removal position whereby the replaceable tip is detached from the end part.

11. The suction device according to claim 7, wherein at least one of the removal means and the end of the removal means nearest to the replaceable tip is provided with means forming a gas passage between the sample space of the tip and the cylindrical space of the suction device.

12. The suction device according to claim 7, wherein the piston is provided with a telescopically movable extension for moving the removal means to the removal position.

* * * * *